United States Patent
Paparaju et al.

(10) Patent No.: US 11,443,231 B2
(45) Date of Patent: Sep. 13, 2022

(54) AUTOMATED SOFTWARE SELECTION USING A VECTOR-TRAINED DEEP LEARNING MODEL

(71) Applicant: Red Hat, Inc., Raleigh, NC (US)

(72) Inventors: SriKrishna Paparaju, Bangalore (IN); Avishkar Gupta, Noida (IN)

(73) Assignee: RED HAT, INC., Raleigh, NC (US)

(*) Notice: Subject to any disclaimer, the term of this patent is extended or adjusted under 35 U.S.C. 154(b) by 915 days.

(21) Appl. No.: 16/165,013

(22) Filed: Oct. 19, 2018

(65) Prior Publication Data

US 2020/0125996 A1    Apr. 23, 2020

(51) Int. Cl.
G06N 20/00 (2019.01)
G06N 7/00 (2006.01)
G06F 8/41 (2018.01)

(52) U.S. Cl.
CPC .......... *G06N 20/00* (2019.01); *G06F 8/433* (2013.01); *G06N 7/005* (2013.01)

(58) Field of Classification Search
CPC ........ G06N 20/00; G06N 7/005; G06F 8/433
USPC ......................................................... 706/12
See application file for complete search history.

(56) References Cited

U.S. PATENT DOCUMENTS

| 9,942,085 B2 | 4/2018 | Tsagkaris et al. |
| 2013/0254757 A1* | 9/2013 | Yousouf .................... G06F 8/61 717/174 |
| 2017/0132509 A1 | 5/2017 | Li et al. |
| 2017/0228659 A1* | 8/2017 | Lin ........................... G06N 3/08 |
| 2019/0220253 A1* | 7/2019 | Pradhan ................... G06N 3/08 |
| 2020/0014607 A1* | 1/2020 | Gangadhar ............ H04L 41/16 |

FOREIGN PATENT DOCUMENTS

| CN | 107808278 A | 3/2018 |
| CN | 108304556 A | 7/2018 |

OTHER PUBLICATIONS

Developer Recommendation for Crowdsourced Software Development Tasks (Year: 2015).*
Matrix Factorization Techniques for Recommender Systems (Year: 2009).*
Deep Learning based Recommender System: A Survey and New Perspectives (Year: 2018).*

(Continued)

*Primary Examiner* — Omar F Fernandez Rivas
*Assistant Examiner* — Em N Trieu
(74) *Attorney, Agent, or Firm* — Kilpatrick Townsend & Stockton LLP

(57) ABSTRACT

A processing device can establish a vector-trained, deep learning model to produce software dependency recommendations. The processing device can build a list of software dependencies and corresponding metatags for each of the software dependencies, and generate a probability distribution from the list. The processing device can sample the probability distribution to produce a latent vector space that includes representative vectors for the software dependencies. The processing device can train a hybrid deep learning model to produce software dependency recommendations using the latent vector space as well as collaborative data for the software dependencies.

20 Claims, 5 Drawing Sheets

(56) References Cited

OTHER PUBLICATIONS

Betru, B.T., et al., "Deep Learning Methods on Recommender System: A Survey of State-of-the-art," International Journal of Computer Applications, Mar. 2017, https://www.ijcaonline.org/archives/volume162/number10/betru-2017-ijca-913361.pdf.

Karamanolakis, G., et al., "Item Recommendation with Variational Autoencoders and Hetergeneous Priors," RecSys '18, Jul. 17, 2018, https://arxiv.org/pdf/1807.06651.pdf.

Zhang, S., et al., "Deep Learning based Recommender System: A Survey and New Perspectives," ACM J. Comput. Cult. Herit., Aug. 3, 2017, https://arxiv.org/pdf/1707.07435.pdf.

\* cited by examiner

AUTOMATED SOFTWARE SELECTION USING A VECTOR-TRAINED DEEP LEARNING MODEL

TECHNICAL FIELD

The present disclosure relates generally to software development tools. More specifically, but not by way of limitation, this disclosure relates to providing a software developer with automated, machine-learning-based selections of software that takes the form of pre-existing application dependencies that a developer can use to implement various functions.

BACKGROUND

In software development, software dependencies are pre-existing code modules available to the developer to carry out a needed function. A software dependency often takes the form of a pre-existing software package or library to handle some task. For example, a pre-existing package for audio processing might be acquired and used by a software developer to implement the audio tasks in a videoconferencing application. Software dependencies can also take the form of a service deployed in a cloud or on a server to provide some function. In such a case, the pre-existing code module runs remotely and transparently, and the developer treats the service as the dependency.

Modern software development makes heavy use of dependencies and software developers can find it difficult to choose from the hundreds or thousands of software dependencies available for a given task. The choice becomes even more difficult over time because dependencies evolve over time with newer versions, additional features, and newly introduced vulnerabilities that need to be avoided.

DETAILED DESCRIPTION

Figure 1:
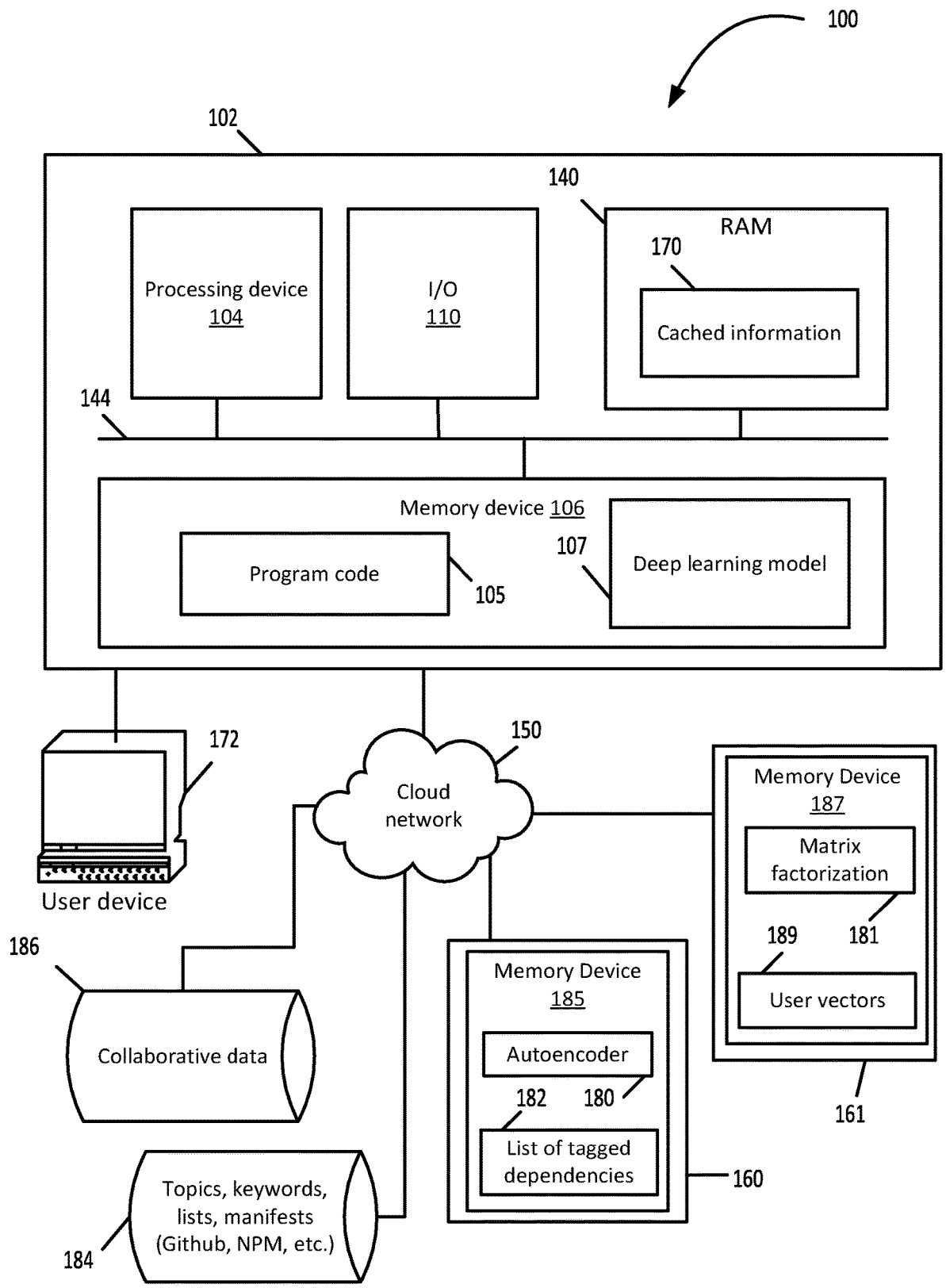
FIG. 1 is a block diagram of a system that provides automated software dependency selection according to some aspects of the disclosure.

A software dependency can take the form of a pre-existing software package to handle some task within or for an application. For example, a pre-existing package for audio processing might be acquired and used by a software developer to implement the audio tasks in a videoconferencing application. A software dependency can also take the form of a software library. Additionally, a software dependency can take the form of a service that is called by the application. The service can reside in a cloud or on a server. In such a case, the pre-existing software runs remotely and transparently. Modern software development relies on software dependencies and software developers can find it difficult to choose from the growing number of dependencies available for a given task.

Some examples of the present disclosure overcome one or more of the issues mentioned above by providing a hybrid vector-trained, deep learning model that can select software dependencies for an application under development. Such a software dependency might also be referred to as an application dependency. The model can be periodically retrained to update its knowledge of available dependencies. The model can make use of both information regarding the purpose of the available dependencies and collaborative data regarding previous usage of available dependencies by software developers. The software dependencies can be incorporated into software by developers who receive the selection or automatically by an intelligent software development platform.

Some examples of the present disclosure establish a deep learning model to produce software dependency recommendations. As an example, a processing device in a system can build a list of software dependencies and corresponding metatags for each of the software dependencies to generate an initial vector space from the list. The initial vector space includes item vectors for the software dependencies. The initial vector space can be used to produce a probability distribution, which can be sampled to produce a latent vector space. The processing device can determine item similarity based on distances between the representative vectors. The processing device can train a deep learning model to produce software dependency recommendations using the latent vector space and collaborative data for the software dependencies. Collaborative data reflects how the dependencies are being used by developers in general.

In some examples, a processing device builds the list of software dependencies by accessing a registry of software dependencies with metatags. In some examples, the initial vector space is sampled to produce the probability distribution whose parameters are learned using a variational auto-encoder and the collaborative data includes user vectors corresponding to the software dependencies. The representative vectors sampled from the probability distribution can be combined with the user vectors using probabilistic matrix factorization. Once a trained, deep learning model has been established, it can receive user input, for example, in the form of an application stack for a software application under development. The deep learning model can then select a software dependency or software dependencies to recommend.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a system 100 that provides automated software dependency selection according to some aspects of the disclosure. More specifically, the system 100 includes a computing device 102. Examples of the computing device 102 can include a server, laptop computer, desktop computer, or any combination of these. The computing device 102 can execute software as defined below, which causes computing device 102 to perform the tasks of training and retraining a deep learning model to provide automated software dependency selection according to some aspects of the disclosure. Software can include computer-readable instructions that are executable by a processing device 104, such as program code instructions 105. The system can be programmed in any suitable programming language, such as Java, C++, C, Python, or any combination of these. Note that the software that implements dependency selection as described in an exemplary fashion herein is distinct from the software that makes up dependencies or the application for which dependencies are being selected.

In FIG. 1, computing device 102 includes the processing device 104, memory device 106, an input/output (I/O) module or modules 110, and a random-access memory (RAM) 140. A bus or interconnect 144 is also provided to allow for inter- and intra-device communications using, for example, I/O module 110. I/O module 110 can include a network interface (not shown), which in turn communicates with cloud network 150. Cloud network 150 connects computing device 102 to cloud servers 160 and 161, which in this example can provide some of the functions used to train the deep learning model 107. Cloud servers 160 and 161 can also store certain intermediate files used during the training process. Each cloud server includes a processing device, a memory device, I/O, and other components similar to computing device 102 and other typical computing devices.

In the example of FIG. 1, cloud server 160 includes variational autoencoder 180. The variational autoencoder includes computer program instructions stored in memory device 185 of cloud server 160. Also stored in memory device 185 of cloud server 160 is a list of dependencies 182, which includes the metatags describing the dependencies. This list 182 can built from stored information 184 such as topic descriptions, keywords, lists, and manifests available from on-line repositories. Examples of such on-line repositories include Github and NPM, which is a JavaScript package manager. The list is a vector space with many dimensions because of the many software dependencies and the various types of metatags available. The variational autoencoder reduces the dimensionality of the list by learning the parameters to generate a probability distribution (not shown), and sample from this distribution the values for all items to produce a latent vector space (not shown). The latent vector space therefore can represent the list of much higher dimension using a lower dimension.

Still referring to FIG. 1, cloud server 161 includes a memory device 187, in which computer program instructions 181 that perform matrix factorization are stored. Matrix factorization can be used to combine collaborative data 186 with the representative vectors from the latent vector space sampled from the probability distribution mentioned above. The collaborative data is converted to user vectors 189, which are also stored in memory device 187 of server 161. In the example of FIG. 1, cached information 170, such as vectors, probability distributions, metatags, and other information used by system 100 may be stored in RAM 140. In addition to connecting computing device 102 to cloud servers 160 and 161, cloud network 150 also connects computing device 102 to user device 172, which may be a personal computer, smartphone, tablet computer, or some other type of client device. User input can be received by computing device 102 through user device 172. Additionally, selected dependency recommendations can be displayed to a user on user device 172. User input and display functions can alternatively or additionally be provided through peripherals (not shown) locally attached to computing device 102.

Figure 2:
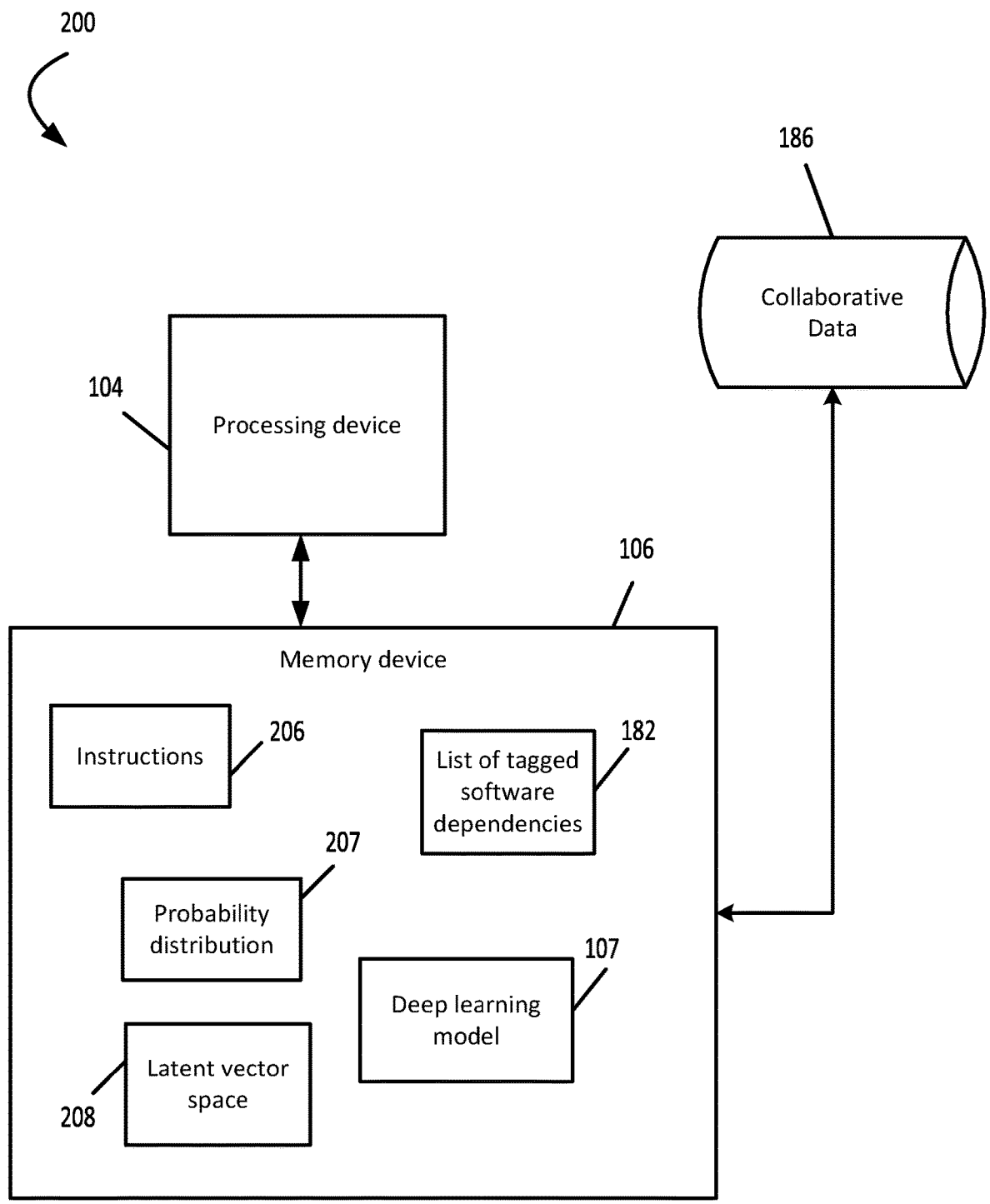
FIG. 2 is a block diagram of another system that provides automated software dependency selection according to some aspects of the disclosure.

FIG. 2 is a block diagram of an example system 200 that provides automated software dependency selection according to some aspects of the disclosure. The system 200 includes the processing device 104 that can execute computer program code, also referred to as instructions or program code instructions, for performing operations related to vector-training a deep learning model and using the deep learning model providing automated software dependency selection. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, etc. The processing device 104 can execute one or more operations for building a list of software dependencies and generating an initial vector space from the list. The processing device can determine item similarity based on distances between the representative vectors and combine the latent vector space sampled from the probability distribution with collaborative data for the software dependencies to train the deep learning model to produce software dependency recommendations. Since both an initial vector space describing available software dependencies and user vectors describing collaborative data can contribute the model, the model can be referred to as a vector-trained deep learning model. The processing device 104 can execute program code instructions 206 stored in the memory device 106 to train the deep learning model and use the deep learning model to select software dependencies and recommend the selected software dependencies.

Memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 206. A computer-readable medium can include electronic, optical, magnetic, or other storage devices capable of providing the processing device with computer-readable instructions 206 or other program code. Non-limiting examples of the memory device 106 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 106 can also include vector-trained, deep learning model 107 and stored lists, vectors, and other information needed to train and retrain deep learning model 107. The system of FIG. 2 differs from the system of FIG. 1 in that the system of FIG. 2 includes more local resources to train the deep learning model, whereas the system of FIG. 1 relies on cloud resources to provide, as examples, the variational autoencoder and matrix factorization. Deep learning model 107 can be stored and trained in memory device 106 in either case. Use of cloud resources as shown in FIG. 1 may reduce training time for deep learning model 107 as compared to not using cloud resources as illustrated in FIG. 2. The system of FIG. 2 includes the same collaborative data 186 as shown in FIG. 1. The probability distribution 207, latent vector space 208 and list of tagged software dependencies 182 are all stored in memory device 106 in the example shown in FIG. 2. Although FIGS. 1 and 2 depict a certain arrangement of components for illustrative purposes, other examples can include any number and combination of these components arranged in any suitable configuration.

Figure 3:
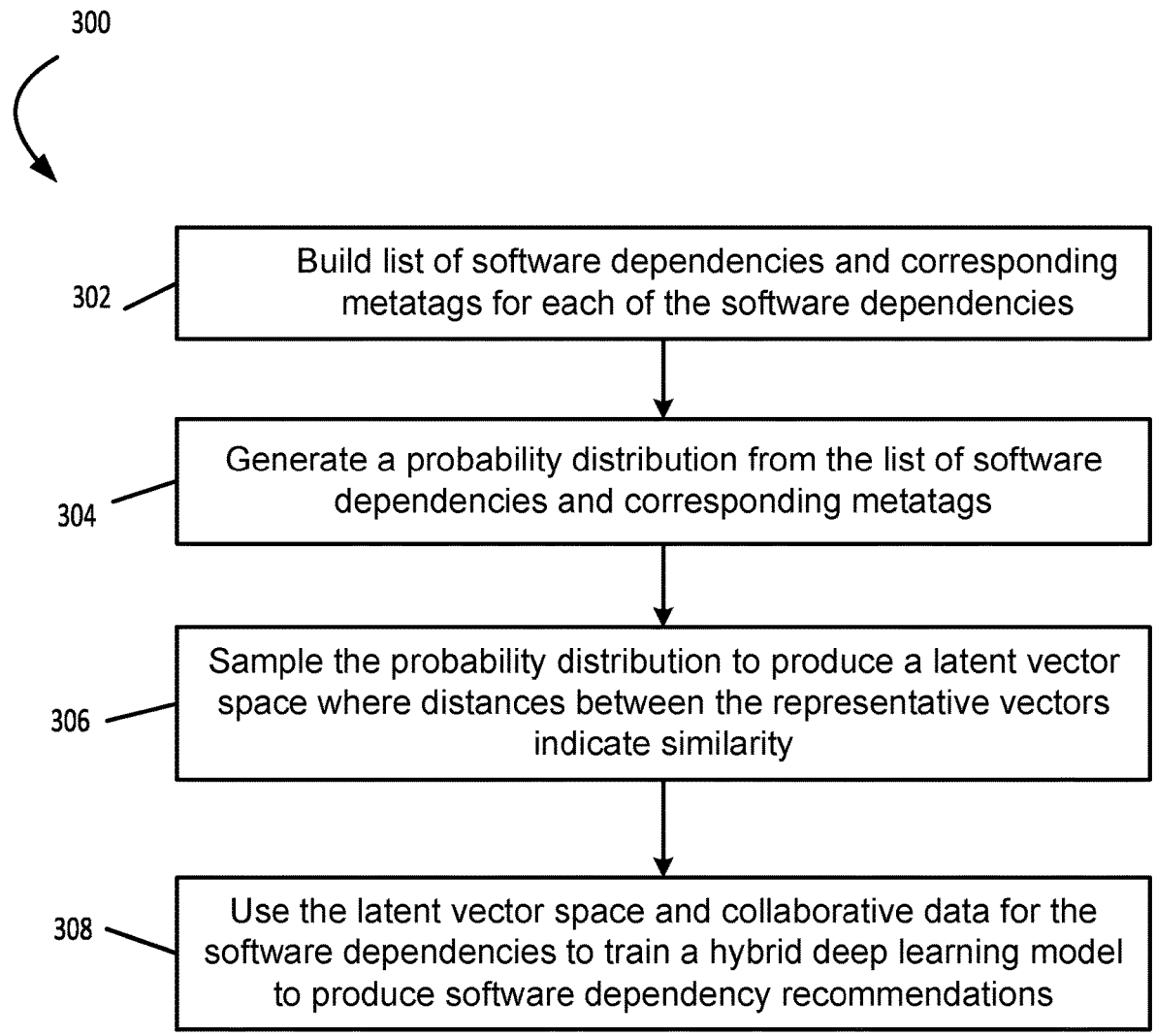
FIG. 3 is a flowchart of a process for providing automated software dependency selection according to some aspects of the disclosure.

In some examples, a processing device (e.g., processing device 104) can perform one or more of the operations shown in FIG. 3 to provide automated software dependency selection using a vector-trained, deep learning model according to some aspects of the disclosure. In other examples, the computing device can implement more operations, fewer operations, different operations, or a different order of the operations depicted in FIG. 3. Process 300 of FIG. 3 is described below with reference to components discussed above.

In block 302 of FIG. 3, the processing device 104 builds a list 182 of software dependencies and corresponding metatags for each of the software dependencies. At block 304, processing device 104 generates a probability distribution 207 from the list. The initial vector space will include item vectors for the software dependencies. The size of the initial vector space will depend on the number of types of metatags for the dependencies of the particular software ecosystem of interest. The number of dimensions for the initial vector space in some aspects can range from dozens to thousands. At block 306, processing device 104 samples from the probability distribution to produce a latent vector space. At block 308, processing device 104 uses the representative vectors and collaborative data 186 for the software dependencies to train the deep learning model 107 to produce software dependency recommendations.

The vector-trained deep learning model uses vector-based representations of dependencies along with collaborative data from manifests to select dependencies to suggest to developers. Generating these representations relies initially on receiving or information about the content of dependencies that may be recommended. These software dependencies have no inherent content that can be used, therefore in at least some aspects, a dependency is represented using the intent fulfilled by the dependency. The dependencies, when uploaded to a package management tool's registry, are uploaded with metatags describing the package's intent. A software dependency can be thought of as serving the intent that is formed by the combination of the metatags associated with the dependency itself and the metatags of its dependencies, since each of its own dependencies contributes some functionality to the intention of the software dependency itself.

Figure 4:
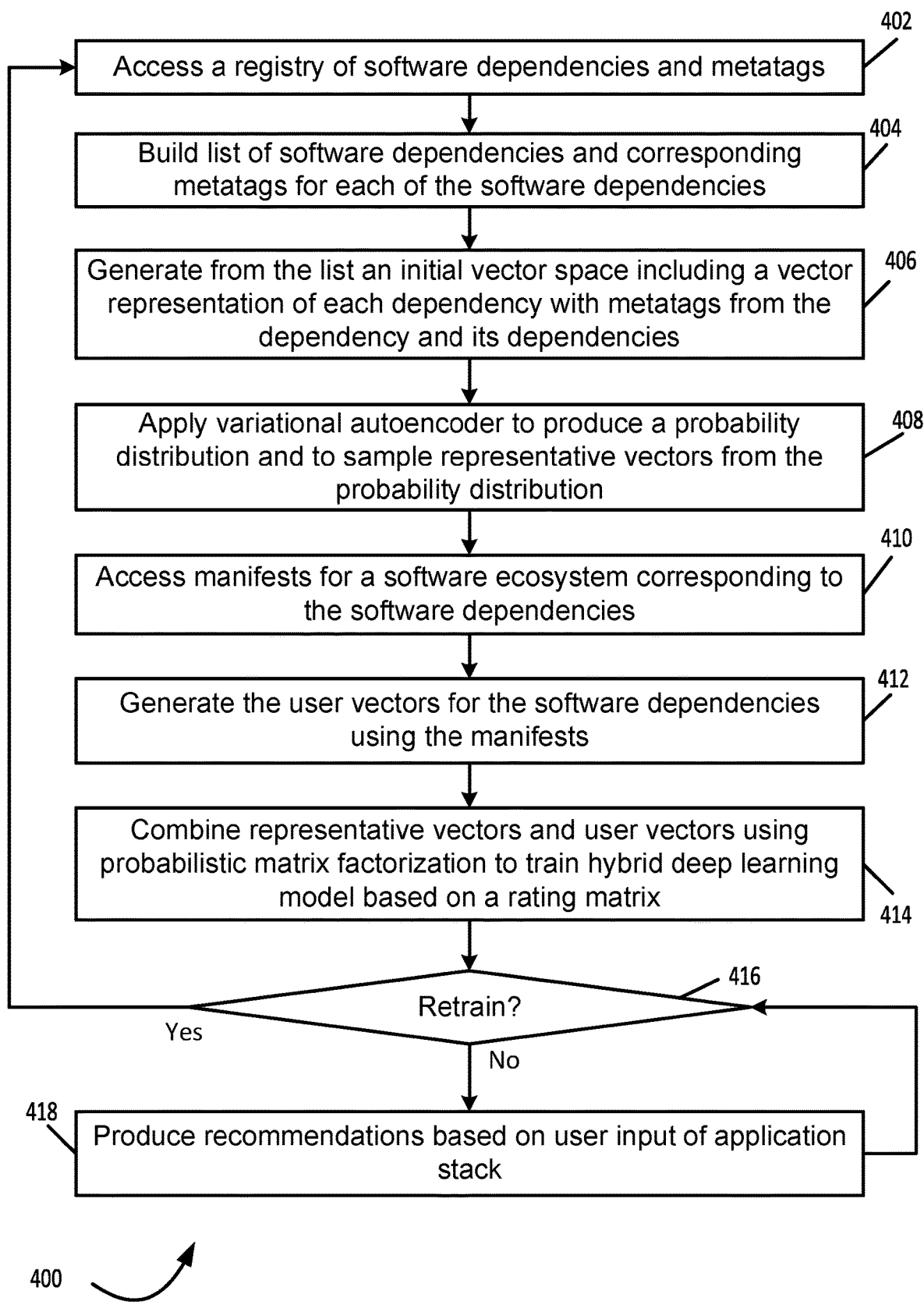
FIG. 4 is a flowchart of another process for providing for providing automated software dependency selection according to some aspects of the disclosure.

As another example, a computing device such as processing device 104 can perform the operations of process 400 shown in FIG. 4 to provide automated software dependency selection using a vector-trained, deep learning model according to some aspects of the disclosure. At block 402, processing device 104 accesses a registry of software dependencies and metatags. At block 404, processing device 104 builds the list 182 of software dependencies and corresponding metatags for each of the software dependencies. At block 406, the processing device 104 generates an initial vector space. This initial vector space includes a vector representation of each dependency as a combination of metatags, both from the software package or service that makes up the dependency itself and from its dependencies as well. At block 408, processing device 104 applies variational autoencoder 180 to the initial vector space to learn the parameters for a probability distribution and sample from the probability distribution representative vectors in the latent vector space. The variational autoencoder 180 learns a lower-dimension representation of the software dependencies. This representation maps the software dependencies to a latent vector space 208 where the distance between representative vectors can provide information about the similarity between two dependencies. Distances between vectors in the latent vector space can be measured in any of various ways, including as examples, cosine distance or Euclidean distance. A variational autoencoder in some aspects does not learn these representative vectors but instead learns and uses the probability distribution. The representative vectors can then be sampled from the probability distribution as needed to determine distances.

The vector-trained deep learning model according to certain aspects is a hybrid model that is based on both information about the content of the software dependencies themselves and collaborative data that reflects how the dependencies are being used. The operations above describe how the content-based portion of the model is obtained. Still referring to FIG. 4, at block 410, the collaborative data 186 is accessed for the appropriate software ecosystem as determined by the software being developed that will make use of the dependencies. In certain aspects, the collaborative data 186 includes manifest files (manifests) from public sources, wherein each manifest file corresponds to a software dependency. A manifest file lists repositories for a dependency as well as a mapping of where the files from these repositories need to be located in a working directory for the dependency to function properly. The manifests are used to generate user vectors for each software dependency at block 412. Each transaction can be represented as a collection of the dependencies that are present in the manifest, and each manifest can be treated as corresponding to a separate user. These dependencies can then be formatted as user vectors 189. A user vector includes manifests represented by rows and packages represented by columns. Matrix factorization as provided by computer program instructions 181 can be used to combine user vectors with the representative vectors at block 414. The latent vector space is a lower-dimension vector space obtained from the probability distribution generated by the variational autoencoder. In some aspects, the probability distribution is a Gaussian distribution and a conjugate prior for the Gaussian distribution is imposed on the matrix factorization and optimal hyper parameter values are obtained to produce the vector-trained deep learning model 107, which is based on a completed rating matrix.

Continuing with FIG. 4, the deep learning model can be retrained based on updated software dependencies as needed. If a retraining is triggered at block 416, process 400 repeats from block 402 to update the model based on newly available or updated dependencies. The processing device 104 uses the deep learning model to select software dependencies and produces recommendations at block 418. In some aspects, the selection is triggered when a software developer uploads the proposed application stack determined thus far for the software being developed. The selection can be triggered in other ways, such as by receiving user input requesting a recommendation according to specific parameters. The retraining process can be triggered based on a manual request from personnel who maintain the recommendation system, based on the passage of time, or based on any other event. If retraining is triggered in an automated fashion, a notice can be provided to a responsible person to monitor or test the retrained model prior to deployment. For example, a retrained model can be testing with a small number of users prior to being generally deployed.

Figure 5:
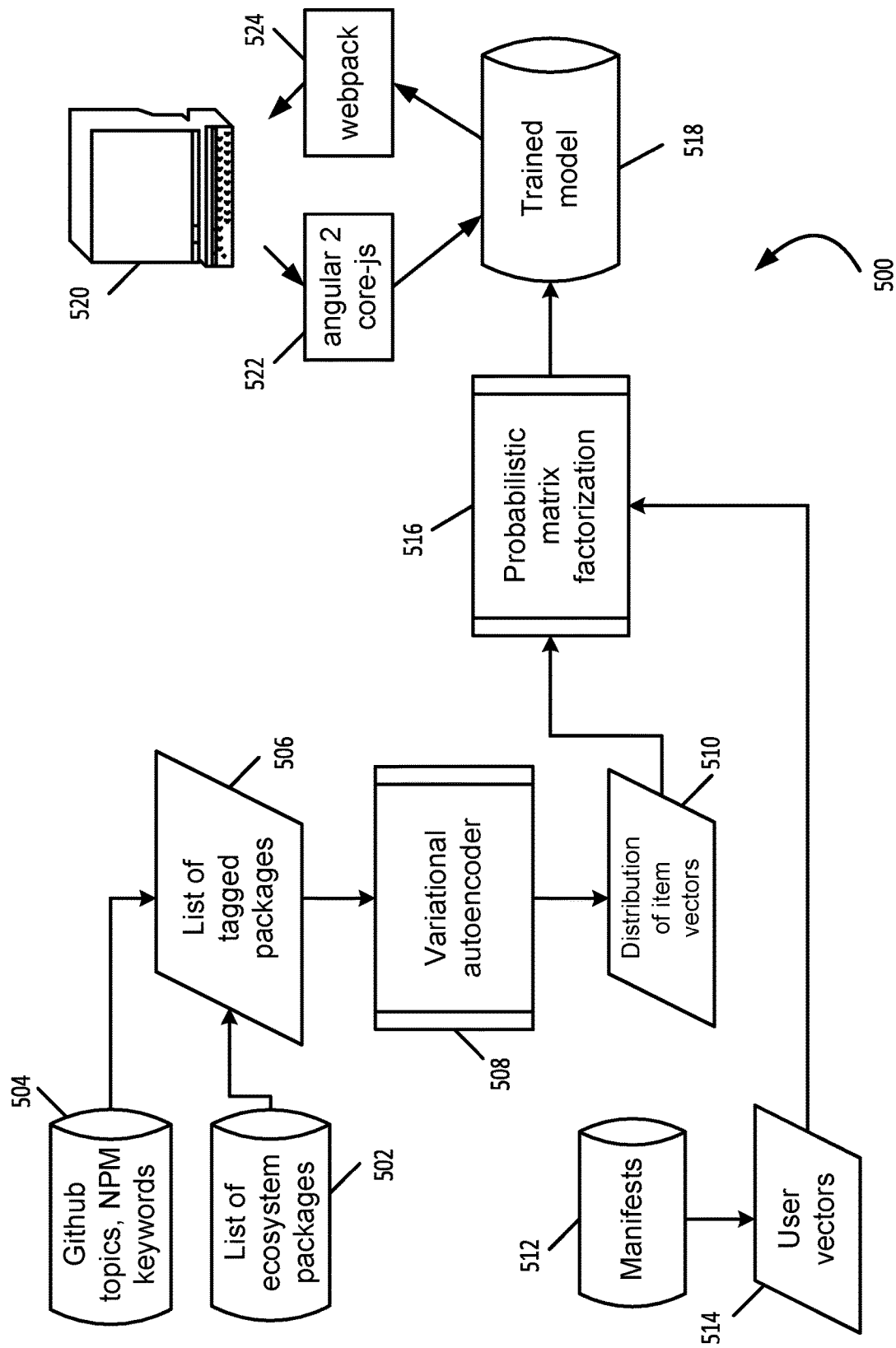
FIG. 5 is a data flow diagram showing the training and use of a deep learning model for software package selection according to some aspects of the disclosure.

FIG. 5 is a data flow diagram showing the training and use of a deep learning model for software package selection according to some aspects of the disclosure. In this example, ecosystem includes software packages as dependencies for application software and a developer is seeking to obtain a recommendation of a software package. In data flow 500, the software package registry includes a list 502 of software packages and corresponding metatags 504 in the form of Github topics and NPM keywords. Many software packages and their associated data are available on Github and in the registries of package managers such as NPM. The software packages, when uploaded to a package management tool's registry, such as the NPM registry, are uploaded with keywords or descriptions that serve as metatags describing the intent of the software package. The list 502 and metatags 504 for the list or tagged packages 506 that is fed to variational autoencoder 508. Variational autoencoder 508 maps available software packages to a vector space where the distance between the vectors can provide information about the similarity between two packages. The variational autoencoder produces a probability distribution 510 of item vectors and the representative vectors can then be sampled from the probability distribution.

Still referring to data flow 500 of FIG. 5, collaborative data is provided to the model by manifests 512 from a public source such as Github, where each manifest is treated as a separate transaction. Each transaction can be represented as a collection of the dependencies that are present in a manifest, and each manifest can be treated as corresponding to a separate user. The users are represented by user vectors. This collaborative data can then be fed to a probabilistic matrix factorization model. Probabilistic matrix factorization 516 is used to combine the latent item vectors sampled from the probability distribution 510 with user vectors 514. Vector-trained, deep learning model 518 is produced by the probabilistic matrix factorization by imposing a conjugate prior for the distribution 510 and obtaining the optimal hyper parameter values to produce a completed rating matrix.

Once deep learning model 518 has been trained as shown in FIG. 5, a developer can, through user device 520, submit an application stack to the system to obtain a recommendation. In this particular example, the application stack 522 already includes references to the core-js and the angular-2 packages. Trained model 518 selects a software package 524 called webpack and recommends this package to the application developer through user device 520.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "above," "below," when referring to numerical comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
building a list of software application dependencies and corresponding metatags for each of the software application dependencies;
generating a probability distribution based on the list of software application dependencies and corresponding metatags;
generating user vectors for the software application dependencies using collaborative data for a software ecosystem corresponding to the software application dependencies;
sampling the probability distribution to produce a latent vector space wherein distances between representative vectors from the latent vector space indicate similarity; and
combining, using matrix factorization, the latent vector space and the user vectors to train a hybrid deep learning model to provide software application dependency recommendations.

2. The system of claim 1 wherein the operations further comprise accessing a registry of software application dependencies and metatags to build the list of software application dependencies and corresponding metatags.

3. The system of claim 1 wherein the operation of generating the probability distribution comprises using a variational autoencoder.

4. The system of claim 1 wherein the collaborative data comprises manifests corresponding to the software application dependencies.

5. The system of claim 4 wherein the operation of combining the latent vector space and the user vectors comprises using a rating matrix to train the hybrid deep learning model.

6. The system of claim 1 wherein the operations further comprise:
receiving user input of an application stack; and
producing a software application dependency recommendation using the hybrid deep learning model based on the application stack.

7. The system of claim 1 wherein the operations further comprise:
updating the list of software application dependencies and corresponding metatags for each of the software application dependencies; and
retraining the hybrid deep learning model to produce the software application dependency recommendations based on updated software application dependencies.

8. A method comprising:
building, by a processing device, a list of software application dependencies and corresponding metatags for each of the software application dependencies;
generating, by the processing device, a probability distribution based on the list of software application dependencies and corresponding metatags;
generating, by the processing device, user vectors for the software application dependencies using collaborative data for a software ecosystem corresponding to the software application dependencies;
sampling, by the processing device, the probability distribution to produce a latent vector space wherein distances between representative vectors from the latent vector space indicate similarity; and
combining, by the processing device, using matrix factorization, the latent vector space and the user vectors to train a hybrid deep learning model to provide software application dependency recommendations.

9. The method of claim 8 further comprising accessing a registry of software application dependencies and metatags to build the list of software application dependencies and corresponding metatags.

10. The method of claim 8 wherein the probability distribution is generated using a variational autoencoder.

11. The method of claim 8 wherein the collaborative data comprises manifests corresponding to the software application dependencies.

12. The method of claim 11 wherein combining the latent vector space and the user vectors comprises using a rating matrix to train the hybrid deep learning model.

13. The method of claim 8 further comprising:
receiving user input of an application stack; and
producing a software application dependency recommendation using the hybrid deep learning model based on the application stack.

14. The method of claim 8 further comprising:
updating the list of software application dependencies and corresponding metatags for each of the software application dependencies; and
retraining the hybrid deep learning model to produce the software application dependency recommendations based on updated software application dependencies.

15. A non-transitory computer-readable medium comprising program code that is executable by a processing device for causing the processing device to:
build a list of software application dependencies and corresponding metatags for each of the software application dependencies;
generate a probability distribution based on the list of software application dependencies and corresponding metatags;
generate user vectors for the software application dependencies using collaborative data for a software ecosystem corresponding to the software application dependencies;
sample the probability distribution to produce a latent vector space wherein distances between representative vectors from the latent vector space indicate similarity; and
combine, using matrix factorization, the latent vector space and the user vectors to train a hybrid deep learning model to provide software application dependency recommendations.

16. The non-transitory computer-readable medium of claim 15 wherein the program code is further executable for causing the processing device to generate the probability distribution using a variational autoencoder.

17. The non-transitory computer-readable medium of claim 15 wherein the collaborative data comprises manifests corresponding to the software application dependencies.

18. The non-transitory computer-readable medium of claim 17 wherein the program code that is executable to cause the processing device to combine the latent vector space and the user vectors further causes the processing device to use a rating matrix to train the hybrid deep learning model.

19. The non-transitory computer-readable medium of claim 15 wherein the program code is executable by the processing device to cause the processing device to:
receive user input of an application stack; and
produce a software application dependency recommendation using the hybrid deep learning model based on the application stack.

20. The non-transitory computer-readable medium of claim 15 wherein the program code is executable by the processing device to cause the processing device to:
update the list of software application dependencies and corresponding metatags for each of the software application dependencies; and
retrain the hybrid deep learning model to produce the software application dependency recommendations based on updated software application dependencies.

* * * * *